US011008087B2

(12) United States Patent
Uhlig et al.

(10) Patent No.: US 11,008,087 B2
(45) Date of Patent: May 18, 2021

(54) WING-TWIST CONTROLLED AIRCRAFT

(71) Applicant: Facebook, Inc., Menlo Park, CA (US)

(72) Inventors: Daniel Uhlig, Manassas, VA (US);
Cory A. Kays, Manassas, VA (US);
Kevin Uleck, Manassas, VA (US);
Gilbert L. Crouse, Jr., Manassas, VA (US)

(73) Assignee: FACEBOOK, INC., Menlo Park, CA (US)

( * ) Notice: Subject to any disclaimer, the term of this patent is extended or adjusted under 35 U.S.C. 154(b) by 603 days.

(21) Appl. No.: 15/702,441

(22) Filed: Sep. 12, 2017

(65) Prior Publication Data

US 2019/0077497 A1    Mar. 14, 2019

(51) Int. Cl.
*B64C 3/52* (2006.01)
*B64C 39/04* (2006.01)

(52) U.S. Cl.
CPC ............. *B64C 3/52* (2013.01); *B64C 39/04* (2013.01); *B64C 2201/021* (2013.01)

(58) Field of Classification Search
CPC .. B64C 3/52; B64C 39/04; B64C 5/02; B64C 2201/021
See application file for complete search history.

(56) References Cited

U.S. PATENT DOCUMENTS 8,322,650 B2*  12/2012  Kelleher ............... B64C 39/024
                                                    244/45 R
8,333,348 B1*  12/2012  Miller .................... B64C 13/16
                                                    244/199.4
2011/0031354 A1*  2/2011  Kelleher ............... B64C 23/069
                                                    244/45 R
2020/0086972 A1*  3/2020  Batura ..................... B64C 39/04

OTHER PUBLICATIONS

Bowers, Albion H., research slides, titled "On the Minimum Induced Drag of Wings," Aug. 12, 2010.
Bowers, Albion H., et al., "On Wings of the Minimum Induced Drag: Spanload Implications for Aircraft and Birds," NASA/TP—2016-219072, Mar. 2016.
Hileman, J. I., et al., "Airframe Design for Silent Fuel-Efficient Aircraft," Journal of Aircraft, vol. 47, No. 3, May-Jun. 2010.
Jardine, A. Peter, et al., "Improved Design and Performance of the SMA Torque Tube for the DARPA Smart Wing Program," Part of the SPIE Conference on Industrial and Commercial Applications of Smart Structures Technologies, Newport Beach, CA, Mar. 1999, SPIE vol. 3674.
Kudva, J. N., et al., "Overview of the DARPA/AFRL/NASA Smart Wing Program," Part of the SPIE Conference on Industrial and Commercial Applications of Smart Structures Technologies, Newport Beach, CA, Mar. 1999, SPIE vol. 3674.
Sargeant, M.A., et al., "Stability of Hybrid-Wing-Body-Type Aircraft with Centerbody Leading-Edge Carving," Journal of Aircraft, vol. 47, No. 3, May-Jun. 2010.

* cited by examiner

Primary Examiner — Jessica B Wong
(74) Attorney, Agent, or Firm — Keller Jolley Preece

(57) ABSTRACT

The present disclosure directed to an aircraft comprising one or more propulsion devices, a flexible wing, at least two tail booms having a proximal end and a distal end, the tail booms being secured to said flexible wing at the proximal end, wherein the tail booms comprise of a tail section connected at the distal end of said tail boom and wherein the tail section comprises of at least one control surface.

18 Claims, 7 Drawing Sheets

WING-TWIST CONTROLLED AIRCRAFT

FIELD OF THE DISCLOSURE

The present disclosure generally relates to an aircraft having a flexible wing, and a system and method of controlling the same.

BACKGROUND

An objective of wing-twist is to create a lateral roll moment by causing the wing itself to twist at opposite ends and in opposite directions, thereby altering the lift coefficient of each side of the wing. This difference in lift coefficient causes the plane to experience a lateral roll moment and roll the aircraft in a desired direction. In the past, cables and pulleys have been connected to various portions of the wing to induce the wing-twist. For example, the Wright brother's wing-twist system needed a bi-wing setup to function properly, which introduces unnecessary weight and complexity. More modern aircraft, however, rely on spoilers or ailerons affixed to the wing to create a roll moment. As with the cables and pulleys, spoilers, and ailerons within the wing introduce complexity, weight, drag, and power consumption. Moreover, spoilers and ailerons typically only cover small portions of the wingspan, which creates non-uniform lift coefficients throughout the entire wing.

Thus, a need exists for an aircraft that can overcome the deficiencies of the prior art by employing a wing-twist without the use of spoilers/ailerons and without the added complexity and weight of cables and pulleys.

SUMMARY

The present disclosure generally relates to an aircraft comprising one or more propulsion devices, a flexible wing, at least two tail booms having a proximal end and a distal end, the tail booms being secured to said flexible wing at the proximal end, wherein the tail booms comprise of a tail section connected at the distal end of said tail boom and wherein the tail section comprises of at least one control surface.

According to a first aspect, a wing-twist aircraft comprises: a propulsion device; a flexible wing having a first wing tip, a second wing tip, and a midpoint along its wingspan that is located substantially at the center between the first wing tip and the second wing tip; first and second tail booms, each of the first and the second tail booms having a proximal end and a distal end; and first and second tail sections, each of the first and second tail sections having at least one elevator, wherein the first tail section is coupled to the distal end of the first tail boom and the second tail section is coupled to the distal end of the second tail boom.

In certain aspects, the wing-twist aircraft further comprises a third tail boom having a proximal end and a distal end and a third tail section coupled to the distal end of the third tail section, wherein the third tail section includes at least one elevator, and wherein the proximal end of the third tail boom is secured to the flexible wing at the midpoint.

In certain aspects, the propulsion device includes a propeller and an electric motor configured to rotate the propeller.

In certain aspects, the propeller is mounted to the flexible wing in a tractor configuration.

In certain aspects, the propeller is mounted to the flexible wing in a pusher configuration.

In certain aspects, each of the first and second tail sections comprises a rudder.

In certain aspects, the first and second tail sections are configured to adjust the lift distribution of the wing-twist aircraft by twisting the flexible wing to create a lateral roll moment.

In certain aspects, the flexible wing is devoid of movable control surfaces.

In certain aspects, the flexible wing does not include any movable control surfaces between the first wing tip and the second wing tip.

In certain aspects, the first and second tail booms include landing gear.

In certain aspects, the tail boom is configured to carry an intelligence, surveillance, and reconnaissance (ISR) payload.

In certain aspects, the flexible wing further comprises a surface having an array of solar panels.

In certain aspects, the each of the first and second tail sections comprises a surface having one or more solar panels.

In certain aspects, the array of solar panels are configured to charge an energy storage device, wherein the energy storage device is configured to power the electric motor during flight.

In certain aspects, the proximal end of the first tail boom is secured to the flexible wing at a point that is between the midpoint and the first wing tip, and the proximal end of the second tail boom is secured to the flexible wing at a point that is between the midpoint and the second wing tip.

According to a second aspect, a method is provided for controlling an aircraft through adjustment of lift distribution on the flexible wing, the aircraft having a flexible wing, a first tail section coupled to a port side of the flexible wing via a first tail boom, a second tail section coupled to a starboard side of the flexible wing via a second tail boom. The method comprises: receiving, via a processor, a flight command to adjust a rolling moment of the aircraft; controlling, in response to the flight command, a first elevator to assume a first position, wherein the first elevator is coupled to the first tail section; and controlling, in response to the flight command, a second elevator to assume a second position that is different from the first position to twist the flexible wing to a predetermined wing-twist angle, wherein the second elevator is coupled to the second tail section; wherein predetermined wing-twist angle is selected to achieve a predetermined difference in lift coefficient between the port side and the starboard side.

According to a third aspect, a method is provided for controlling an aircraft through adjustment of lift distribution on the flexible wing, the aircraft having a flexible wing, a first tail section coupled to a port side of the flexible wing via a first tail boom, a second tail section coupled to a starboard side of the flexible wing via a second tail boom. The method comprises: receiving, via a processor, a flight command to adjust a rolling moment of the aircraft; and controlling, in response to the flight command, a first elevator coupled to the first tail section and a second elevator coupled to the second tail section to achieve a predetermined elevator degree differential.

In certain aspects, the first elevator and the second elevator are configured to twist the flexible wing to a predetermined wing-twist angle as a function of the predetermined elevator degree.

In certain aspects, the predetermined wing-twist angle is selected to achieve a predetermined difference in lift coefficient between the port side and the starboard side.

In certain aspects, the predetermined elevator degree differential is negative when the flight command is a command to roll left.

In certain aspects, the predetermined elevator degree differential is positive when the flight command is a command to roll right.

BRIEF DESCRIPTION OF THE DRAWINGS

The foregoing and other objects, features, and advantages of the devices, systems, and methods described herein will be readily understood from the following description of particular embodiments thereof, as illustrated in the accompanying figures, where like reference numbers refer to like structures. The figures are not necessarily to scale, emphasis instead being placed upon illustrating the principles of the devices, systems, and methods described herein.

FIG. 2 illustrates a block diagram of an exemplary aircraft control system for the wing-twist aircraft of FIG. 1a.

FIG. 4 illustrates a change in roll coefficient experienced when using wing-twist to control the wing-twist aircraft of FIG. 1a.

DETAILED DESCRIPTION

Figure 1A:
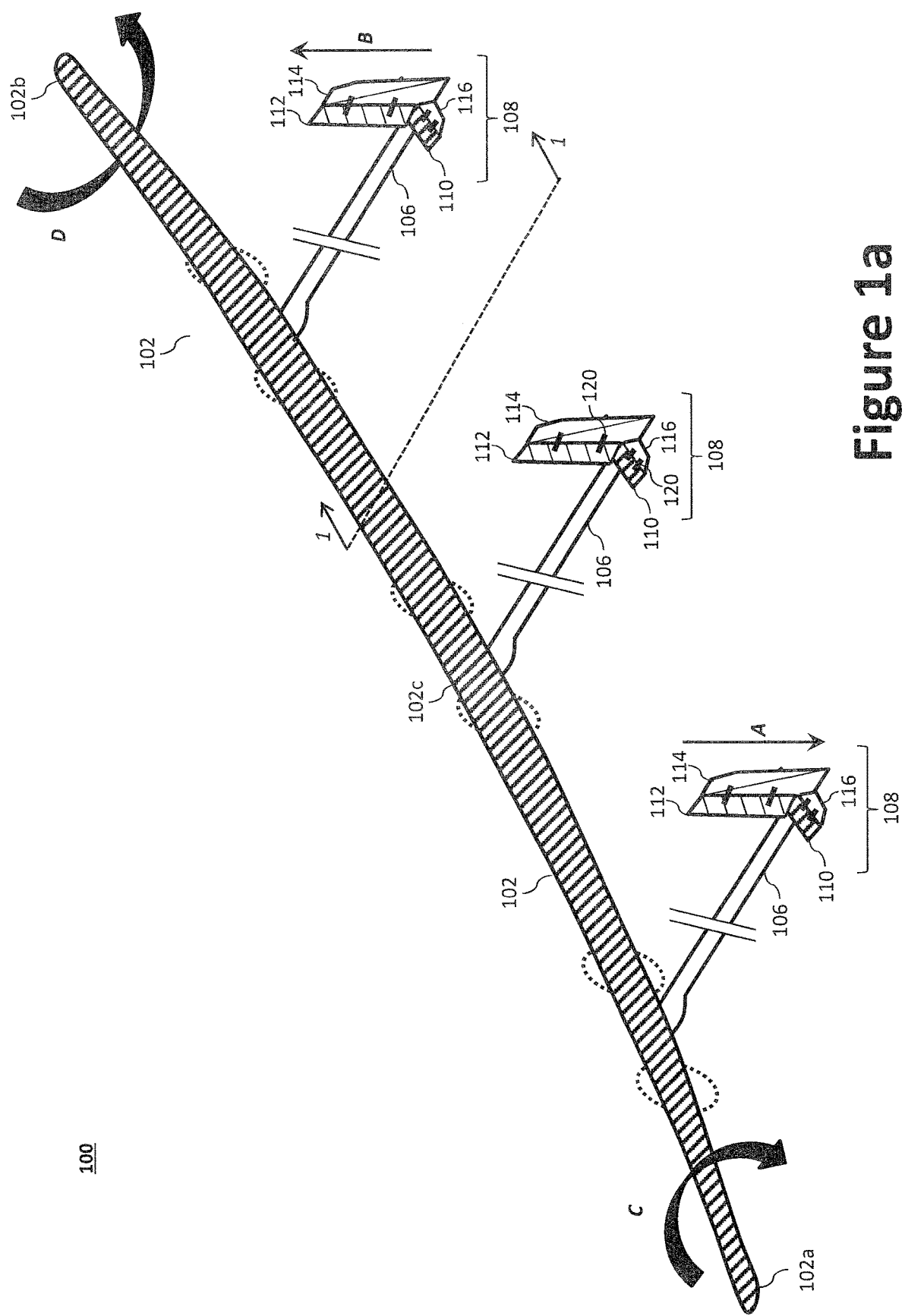
FIG. 1a illustrates an example aircraft with a flexible wing.

Preferred embodiments of the present disclosure will be described herein below with reference to the accompanying drawings. The components in the drawings are not necessarily drawn to scale, the emphasis instead being placed upon clearly illustrating the principles of the present embodiments. For instance, the size of an element may be exaggerated for clarity and convenience of description. Moreover, wherever possible, the same reference numbers are used throughout the drawings to refer to the same or like elements of an embodiment. In the following description, well-known functions or constructions are not described in detail because they may obscure the disclosure in unnecessary detail. No language in the specification should be construed as indicating any unclaimed element as essential to the practice of the embodiments. In the following description, it is understood that terms such as "first," "second," "top," "bottom," "side," "front," "back," and the like, are words of convenience and are not to be construed as limiting terms. For this application, the following terms and definitions shall apply:

The terms "about" and "approximately," when used to modify or describe a value (or range of values), mean reasonably close to that value or range of values. Thus, the embodiments described herein are not limited to only the recited values and ranges of values, but rather should include reasonably workable deviations.

The term "aircraft" refers to a machine capable of flight, including, but not limited to, traditional aircraft, unmanned aerial vehicles (UAVs), drones, lighter than air vehicles, and vertical take-off and landing (VTOL) aircraft, such as rotorcraft (e.g., helicopters) and/or tilt-rotor/tilt-wing aircraft.

The term "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y, and/or z" means "one or more of x, y, and z."

The terms "coupled," "coupled to," and "coupled with" as used herein, each mean a relationship between or among two or more devices, apparatuses, files, circuits, elements, functions, operations, processes, programs, media, components, networks, systems, subsystems, and/or means, constituting any one or more of: (i) a connection, whether direct or through one or more other devices, apparatuses, files, circuits, elements, functions, operations, processes, programs, media, components, networks, systems, subsystems, or means; (ii) a communications relationship, whether direct or through one or more other devices, apparatuses, files, circuits, elements, functions, operations, processes, programs, media, components, networks, systems, subsystems, or means; (iii) a functional relationship in which the operation of any one or more devices, apparatuses, files, circuits, elements, functions, operations, processes, programs, media, components, networks, systems, subsystems, or means depends, in whole or in part, on the operation of any one or more others thereof; and/or (iv) a structural connection, whether attached, affixed, connected, joined, fastened, linked, and/or otherwise secured.

The terms "communicate" and "communicating" refer to (1) transmitting, or otherwise conveying, data from a source to a destination, and/or (2) delivering data to a communications medium, system, channel, network, device, wire, cable, fiber, circuit, and/or link to be conveyed to a destination.

The term "composite material" as used herein, refers to a material comprising an additive material and a matrix material. For example, a composite material may comprise a fibrous additive material (e.g., fiberglass, glass fiber ("GF"), carbon fiber ("CF"), aramid/para aramid synthetic fibers, etc.) and a matrix material (e.g., epoxies, polyimides, and alumina, including, without limitation, thermoplastic, polyester resin, polycarbonate thermoplastic, casting resin, polymer resin, acrylic, chemical resin). In certain aspects, the composite material may employ a metal, such as aluminum and titanium, to produce fiber metal laminate (FML) and glass laminate aluminum reinforced epoxy (GLARE). Further, composite materials may include hybrid composite materials, which are achieved via the addition of some complementary materials (e.g., two or more fiber materials) to the basic fiber/epoxy matrix.

The terms "circuits" and "circuitry" refer to physical electronic components (i.e., hardware) and any software and/or firmware ("code"), which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, circuitry or a device is "operable" to perform a function whenever the circuitry or device comprises the necessary hardware and code (if any is necessary) to perform the function, regardless of whether performance of the function is disabled, or not enabled (e.g., by a user-configurable setting, factory trim, etc.).

The term "data" as used herein means any indicia, signals, marks, symbols, domains, symbol sets, representations, and any other physical form or forms representing information, whether permanent or temporary, whether visible, audible, acoustic, electric, magnetic, electromagnetic, or otherwise manifested. The term "data" is used to represent predetermined information in one physical form, encompassing any and all representations of corresponding information in a different physical form or forms.

The term "database" as used herein means an organized body of related data, regardless of the manner in which the data or the organized body thereof is represented. For example, the organized body of related data may be in the form of one or more of a table, map, grid, packet, datagram, frame, file, email, message, document, report, list, or in any other form.

The term "exemplary" means serving as a non-limiting example, instance, or illustration. As utilized herein, the terms "e.g.," and "for example" set off lists of one or more non-limiting examples, instances, or illustrations.

The term "memory device" means computer hardware or circuitry to store information for use by a processor. The memory device can be any suitable type of computer memory or any other type of electronic storage medium, such as, for example, read-only memory (ROM), random access memory (RAM), cache memory, compact disc read-only memory (CDROM), electro-optical memory, magneto-optical memory, programmable read-only memory (PROM), erasable programmable read-only memory (EPROM), electrically-erasable programmable read-only memory (EEPROM), a computer-readable medium, or the like.

The term "network" as used herein includes both networks and inter-networks of all kinds, including the Internet, and is not limited to any particular network or inter-network.

The term "processor" means processing devices, apparatuses, programs, circuits, components, systems, and subsystems, whether implemented in hardware, tangibly embodied software, or both, and whether or not it is programmable. The term "processor" as used herein includes, but is not limited to, one or more computing devices, hardwired circuits, signal-modifying devices and systems, devices and machines for controlling systems, central processing units, programmable devices and systems, field-programmable gate arrays, application-specific integrated circuits, systems on a chip, systems comprising discrete elements and/or circuits, state machines, virtual machines, data processors, processing facilities, and combinations of any of the foregoing. The processor may be, for example, any type of general purpose microprocessor or microcontroller, a digital signal processing (DSP) processor, an application-specific integrated circuit (ASIC). The processor may be coupled to, or integrated with a memory device.

Modern aircraft use ailerons and/or spoilers to change the local lift coefficient of that portion of the wing. This change in the local lift coefficient causes the wing to experience a lateral roll moment and thus, send the aircraft into a lateral roll which allows the aircraft to turn. The ailerons and spoilers, however, require addition actuators, wiring, and movable surfaces on the outward portions of the wing. The addition of these systems adds unnecessary complexity and weight. In order for ailerons and spoilers to optimally control a modern aircraft, the aircraft's wing must be fixed and stiff. This stiffness decreases the amount of flexing experienced by the aircraft due to the changing aerodynamic loads. If the wing is not sufficiently stiff the ailerons and spoilers will have limited effectiveness because the flex in the wing alters the local lift coefficient and the ailerons and spoilers have a limited amount of control over the local lift coefficient. This creates an issue since the wings used in modern aircraft must be sufficiently flexible to absorb the forces experienced by the wind to prevent damage and ultimately failure. These problems are exacerbated in large wingspan aircraft such as solar-powered high-endurance aircraft, glider, or other aircraft with a wingspan sufficiently long to allow for flexibility. Further, in solar-powered high-endurance aircraft, weight reduction is a major consideration in its design. The issues described above can be solved by controlling an aircraft using the wing-twist phenomena itself instead of relying on complicated or heavy components that increase drag.

Figure 1B:
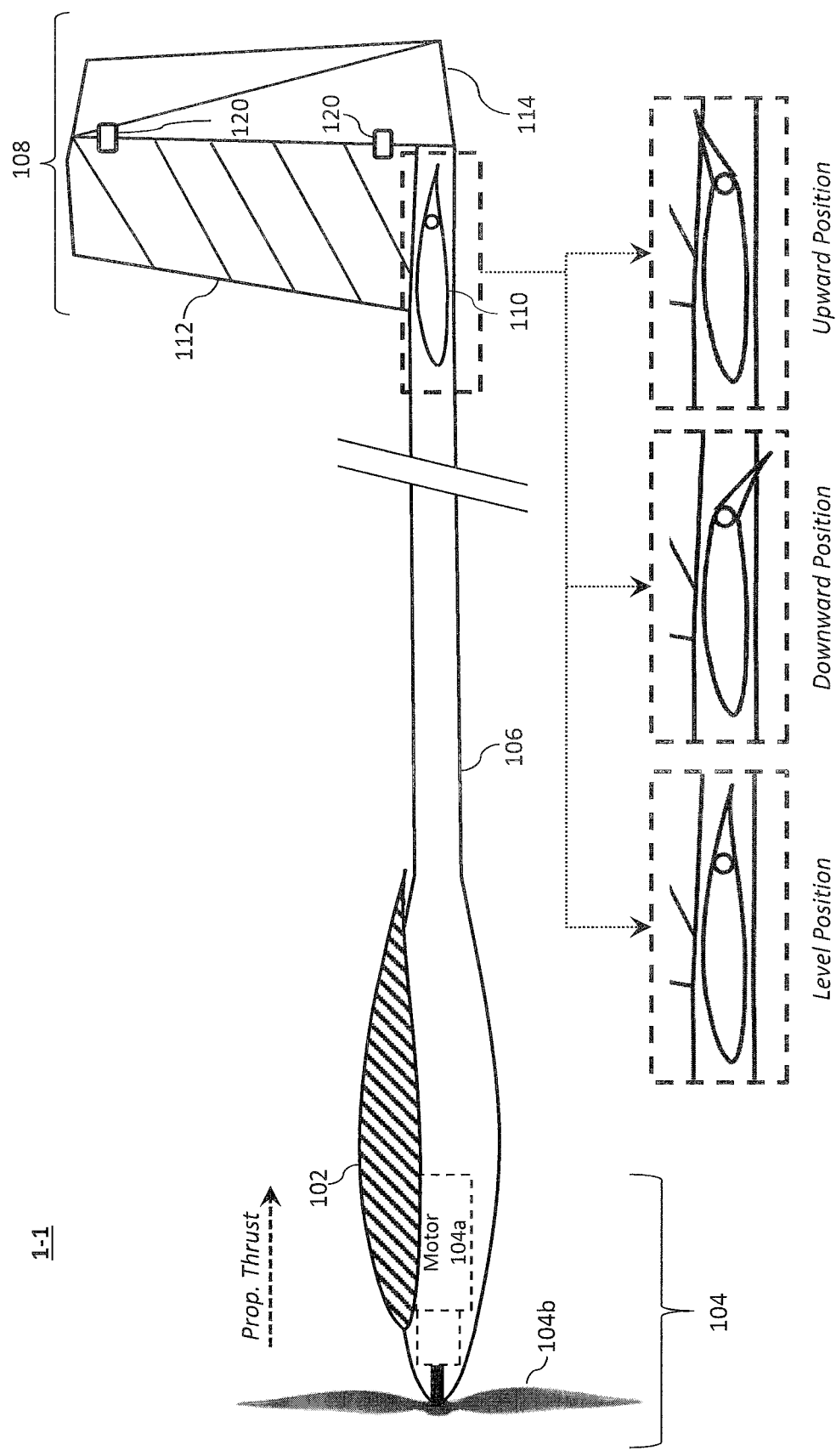
FIG. 1b illustrates a cross section of the exemplary aircraft along line 1-1 of FIG. 1b.

FIGS. 1a and 1b illustrate an example aircraft 100 in a wing-twist configuration (e.g., a wing-twist controlled aircraft). Specifically, FIG. 1a illustrates an isometric view of the aircraft 100, while FIG. 1b illustrates a cross section of the exemplary aircraft along line 1-1. The aircraft 100 generally comprises a flexible wing 102, one or more propulsion device 104, a plurality of tail booms 106 (illustrated as elongated tail booms), and a plurality of tail sections 108.

The flexible wing 102 comprises a first wing tip 102a (port side), a second wing tip 102b (starboard side), and a midpoint 102c along the flexible wing's 102 wingspan that is approximately half way between the first wing tip 102a and the second wing tip 102b. As illustrated, the flexible wing 102 is includes a first wing tip and a second wing tip, with the wingspan therebetween. While the flexible wing 102 is illustrated as generally linear, other configurations are contemplated, such as back-swept, tapered, rectangular, elliptical, forward-swept, and the like. Therefore, the flexible wing 102 may be any type of fixed wing, including, but not limited to, a straight wing, a swept wing, a forward swept wing, a dihedral wing (an upward angle from horizontal), an anhedral wing (a negative dihedral angle—downward angle from horizontal), or any other suitable type of fixed wing as known by those of ordinary skill in the art.

The length of the wingspan may be, for example, 40 to 160 meters, more preferably, 60 to 120 meters, most preferably about 80 meters. While the leading and trailing edges of the flexible wing 102 are illustrated as straight/linear along the length of its wingspan, the flexible wing 102 may be tapered (i.e., the leading and trailing edges may curve inward toward the centerline of the flexible wing 102). As illustrated, the wingspan of the flexible wing 102 may be substantially perpendicular relative to the longitudinal length of the tail booms 106, however, the flexible wing 102 may instead be swept back or swept forward.

To reduce weight and complexity, the flexible wing 102 is generally devoid of movable control surfaces. Control surfaces on the wing typically require additional structural reinforcements and actuators which results in weight. Additionally, adding control surfaces to a wing increases the drag. Control surfaces on a wing may also require the skin panel to be broken into sections as opposed to having an unbroken construction which may allow solar panels to cover more of the upper surface. Furthermore, manufacturing control surfaces adds complexity as attachment mechanisms, hinges, more parts, multiple skin panels must be made. Removing the control surfaces eliminate these complexities.

Unlike existing aircraft, the flexible wing 102 need not include movable control surfaces (e.g., flaps, slats, etc.) along the trailing or leading edges of its wingspan. For example, the upper and lower surface of the flexible wing 102 may be fabricated as a single piece structure without any moving parts. As will be discussed, control of the flexible wing 102 may instead be achieved through control surfaces positioned on one or more of the tail sections 108.

Each tail boom 106 comprises a proximal end and a distal end, where each of the tail booms 106 may be secured at its proximal end to the flexible wing 102, while securing at its distal end to a tail section 108. The plurality of tail booms 106 may be evenly distributed along the length of the flexible wing's 102 wingspan. The plurality of tail booms 106 may include first, second, and third tail booms 106, each of which includes a proximal end and a distal end. As illustrated, the proximal end of the first tail boom 106 may be secured to the flexible wing 102 at a point that is between the midpoint 102$c$ and the first wing tip 102$a$, the proximal end of the second tail boom 106 may be secured to the flexible wing 102 at a point that is between the midpoint 102$c$ and the second wing tip 102$b$, and the third tail boom 106 may be secured to the flexible wing at (or near) the midpoint 102$c$. By controlling the twist of the flexible wing 102 at multiple locations, a gradual smooth variation in twist results between the attachment points between the flexible wing 102 and the tail booms 106. The smooth twist distribution results in the lift variation happening over a large percentage of the span and requiring less of a change in local lift coefficient because the whole wing-lift changes. While the aircraft 100 is illustrated as having three tail booms 106, a person of skill in the art would understand that additional, or fewer, tail booms 106 may be employed to achieve a desired function and depending on, for example, the length of the flexible wing 102.

Each tail boom 106 may further comprise landing gear. For example, a set of wheels and/or skids may be provided on two or more of the tail booms 106. Preferably, at least one wheel in each set of wheels is a steerable wheel. In certain aspects, the tail boom 106 may function as pontoons or floats to enable taking off and landing on water. To that end, the tail booms 106 may be configured as airtight hollow structures to provide buoyancy to the aircraft 100 in water. The two or more wheels may be powered by a motor, such as an electric motor.

Each tail section 108 comprises one or more one control surfaces to steer the tail section 108 in a desired direction. For example, as better illustrated in FIG. 1$b$, each tail section 108 may comprise a vertical stabilizer 112 (e.g., a dorsal fin) extending vertically from the tail boom 106, a rudder 114 operatively coupled to the vertical stabilizer 112, a horizontal stabilizer 110 extending laterally from either side of the tail boom 106, and an elevator 116 operatively coupled to each side of the horizontal stabilizer 110. In certain aspects, the tail section 108 may employ one or more all-moving components (e.g., a stabilator). The elevators 116 may be configured to change the pitch of the tail section 108, while the rudder 114 may be configured to change the yaw of the tail section 108. The aircraft's 100 tail sections 108 may then be selectively controlled to control the overall pitch, roll, and yaw of the aircraft 100, thereby obviating the need for movable control surface on the flexible wing 102.

Each rudder 114 may be rotatably and/or hingedly coupled to a vertical stabilizer 112 via one or more hinges 120 to enable the rudder 114 to move about an axis defined by the vertical stabilizer 112 at its trailing edge. Similarly, the elevators 116 may be rotatably and/or hingedly coupled to the horizontal stabilizer 110 via one or more hinges 120 to enable movement about an axis defined by the horizontal stabilizer 110 at its trailing edge. In certain aspects, one or more of the rudders 114 and/or the elevators 116 may additionally be configured with a mechanism (e.g., rails, tracks, etc.) to allow for other, non-rotatable movement, such as, for example, sliding and/or lateral movement relative to the vertical or horizontal stabilized. In alternative embodiments, one or more of the rudders 114 and/or the elevators 116 may be omitted entirely from a given tail section 108.

Depending on the desired tail configuration, the horizontal stabilizer 110 and vertical stabilizers 112 may be operatively coupled to one another as well as the tail booms 106, or operatively coupled only to the tail booms 106. The tail section 108 may be configured in one of multiple tail configurations, including, for example, fuselage mounted, a cruciform, T-tail, a flying tailplane, a pi-tail (i.e., it-tail), a V configuration, an inverted V configuration (i.e., "∧" configuration), a twin tail (H-tail arrangement or U-tail arrangement), etc. Further, the horizontal stabilizer 110 may be straight, back-swept, tapered, rectangular, elliptical, forward-swept, etc. In certain aspects, the tail section 108 may employ a combination H- and ∧-tail arrangement where the tail section 108 comprises ∧-tail surfaces that couple to the horizontal stabilizer 116 to provide a combination H- and ∧-tail arrangement. An example combination H- and ∧-tail arrangement is described in greater detail by U.S. patent application Ser. No. 15/494,780 to Robert W. Parks et al., which was filed on Apr. 24, 2017 and titled "Vertical Take-Off and Landing Aircraft."

Therefore, persons of ordinary skill in the art will recognize that alternative and/or additional structural arrangements may be implemented to accommodate the design and/or operational requirements of the tail section 108. For example, the tail section 108 may instead employ only one or more vertical stabilizer 114, one or more horizontal stabilizer 116, and/or slanted or offset stabilizers that have both horizontal and vertical dimensions. Additionally, or alternatively, the tail section 108 may include multiple rudders 114 on the vertical stabilizer 112 and/or a plurality of elevators 116 on each side of the horizontal stabilizer 110.

Each propulsion device 104 generally comprises a motor 104$a$ coupled to, and configured to drive/rotate, a propeller 104$b$. The motor 104$a$ may be an electric motor controlled via an electronic speed controller (ESC). To that end, an ESC may also be provided to control the motor 104$a$, which may be integrated (or otherwise coupled) at the proximal end of a tail boom 106 or the flexible wing 102. The propulsion device 104 may be positioned on the flexible wing 102, the tail boom 106 (e.g., at the proximal end), or a combination thereof. For example, each of the propulsion devices 104 may be positioned within, or on, the flexible wing 102 (i.e., wing-mounted) in either a pusher configuration or a tractor configuration.

In another example, a propulsion device 104 may be coupled to, and supported by, the proximal end of each the tail boom 106. In another aspect, a first portion of the propulsion device 104 (e.g., the motor 104$a$) may be coupled to, and supported by, the proximal end of each the tail boom 106, while a second portion of the propulsion device 104 (e.g., the propeller 104$b$) may be coupled to, and supported by, the flexible wing 102. Similarly, rather than using one motor 104$a$ per propeller 104$b$, a single motor 104$a$ may be configured to drive (rotate) multiple propellers 104$b$ via a gearbox and/or a driveshaft between the motor 104$a$ and the two or more propellers 104$b$. Further, while each tail boom 106 is illustrated as having two propulsion devices 104, greater or fewer propulsion devices 104 may be provided at the proximal end of each tail boom 106. Regardless of the propulsion configuration, each of said plurality of propulsion devices 104 are oriented to direct thrust toward the distal end of the tail boom 106 (as indicated by the propeller thrust arrow).

With reference to FIG. 1a, the aircraft 100 is illustrated where the flexible wing 102 is experiencing wing-twist across its wingspan. The pitch and/or yaw of the tail sections 108 may be separately controlled via the rudders 114 and/or elevators 116 to create a local force moment at the location the tail boom 106 attaches to the flexible wing 102. By separately deflecting the control surfaces (e.g., the rudders 114 and/or elevators 116), the overall twist profile of the wing can be tailored and changed using the multiple control surfaces without requirement movable control surface on the flexible wing 102. The control surfaces trim longitudinal and latitudinal forces via changing the average deflection across the multiple control surfaces, and allocating the longitudinal and latitudinal trim differently across the multiple control surfaces to adjust the twist of the wing as required for shape control or roll control.

The example aircraft 100 is illustrated with three tail sections 108, where the left (port) tail section 108 is generating a downward force (direction A), right (starboard) tail section 108 is generating an upward force (direction B), and the middle (midpoint) tail section 108 is in a level position to not impose a twisting force on the flexible wing 102 (generating neither a downward nor an upward force). All three tail sections 108 are responsible for balancing the pitching moment via either an up force or a down force. The total down force of the three tail sections 108 balances the pitching moment while the differences in the three forces are used to twist the wing, and/or change the lift distribution to balance the roll. For example, the tail forces generated by the three tail sections 108 twist the flexible wing 102 to increase the lift coefficient on the left side by increasing the twist (rotation C) and to decreases the lift coefficient on the right side by decreasing the twist in (rotation D). By controlling the twist profile of the wing at locations evenly distributed throughout the flexible wing 102, a gradual smooth variation in twist profile results between the tail boom 106 attachment points. The more distributed the twist profile, the more evenly distributed the lift coefficient will be throughout the flexible wing 102. This allows the lift variation to happen over a larger percentage of the wingspan, thereby requiring less of a change in local lift coefficient to create a lateral roll moment.

The various structural components of the aircraft 100 may be fabricated from metal, a composite material, or a combination thereof. For example, the flexible wing 102 may be fabricated using fused deposition modeling (FDM), stereolithography (SLA), selective laser sintering (SLS), and/or any other suitable type of additive manufacturing/3D printing. A benefit of this fabrication method is that it produces a high-performing, more stable aircraft, using advanced sensing and 3D printing disciplines. FDM is a thermal polymer layer deposition process that produces parts one layer at a time, effectively printing aircraft components rapidly, in low-volume, and to exacting material specifications. Using FDM, numerous wing design iterations may be inexpensively manufactured to meet desired strength and stiffness requirements, control surface sizing, and other characteristics. Further, additional wings may be fabricated to allow for tailored sensor integration, ease of generating additional actuation schemes or altering the control surface placement, ease of characterizing the strain on the wing, and an ability to easily alter the wing's stiffness to provide the best platform for proprioceptive sensing in a given application. This capability also offers robustness against wing damage, as replacement components are readily reproducible.

Figure 2:
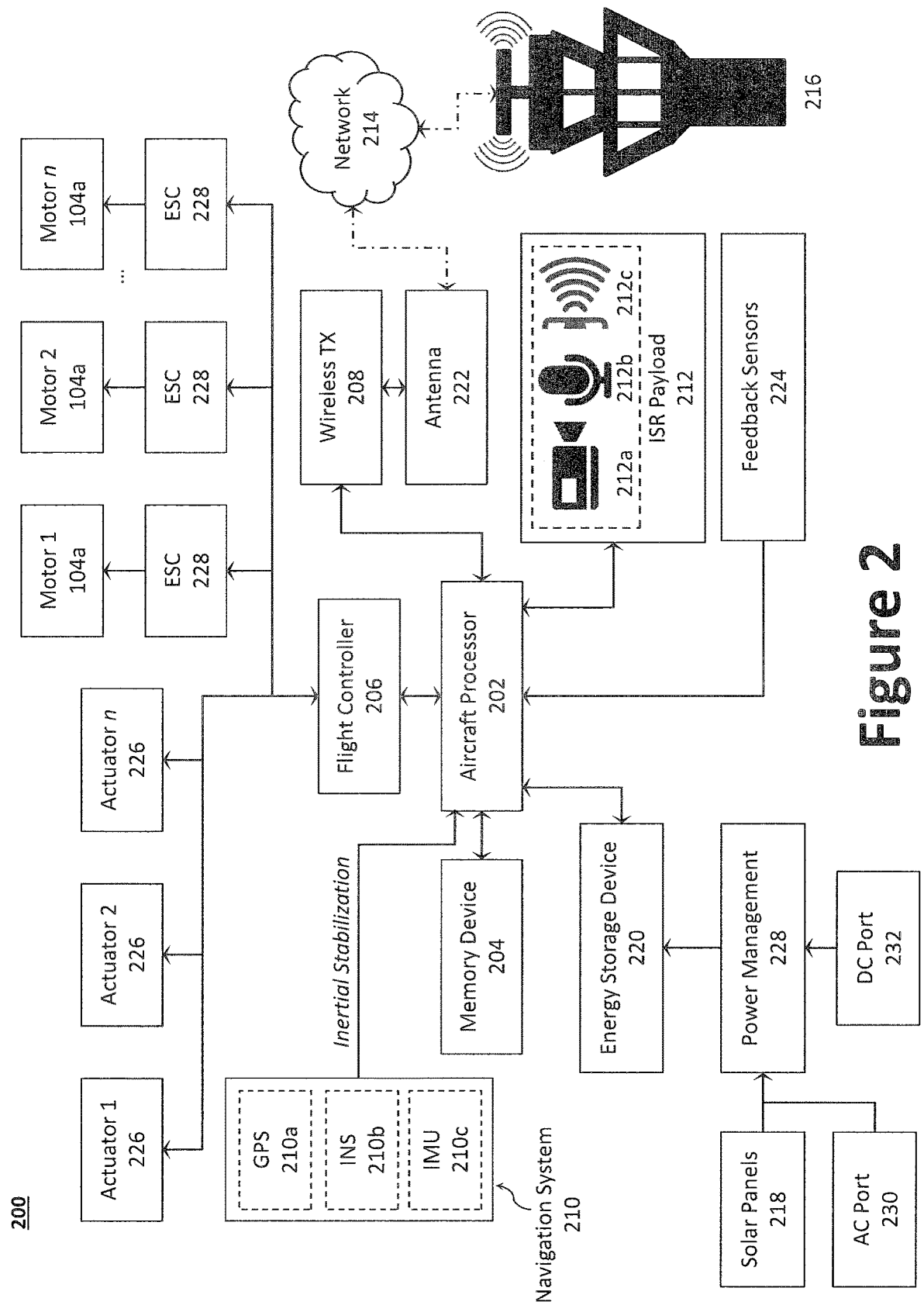

FIG. 2 illustrates a block diagram of an exemplary aircraft control system 400 suitable for the aircraft 100. The aircraft control system 400 may be configured to control the various aircraft components and functions of the aircraft 100; including, inter alia, control and monitoring of wing-twist functionality. As illustrated, the aircraft 100 includes one or more aircraft processors 202 communicatively coupled with at least one memory device 204, a flight controller 206, a wireless transceiver 208, and a navigation system 210. The aircraft processor 202 may be configured to perform one or more operations based at least in part on instructions (e.g., software) and one or more databases stored to the memory device 204 (e.g., hard drive, flash memory, or the like).

The aircraft control system may further include other desired services, such as a wireless transceiver 208 coupled with an antenna 222 to communicate data between the aircraft 100 and a remote device 216 (e.g., portable electronic devices, such as smartphones, tablets, and laptop computers) or other controller (e.g., a base station). For example, the aircraft 100 may communicate data (processed data, unprocessed data, etc.) with the remote device 216 over a network 214. In certain aspects, the wireless transceiver 208 may be configured to communicate using one or more wireless standards such as Bluetooth (e.g., short-wavelength, Ultra-High Frequency (UHF) radio waves in the Industrial, Scientific, and Medical (ISM) band from 2.4 to 2.485 GHz), near-field communication (NFC), Wi-Fi (e.g., Institute of Electrical and Electronics Engineers' (IEEE) 802.11 standards), etc. The remote device 216 may facilitate monitoring and/or control of the aircraft 100 and its payload(s), including an intelligence, surveillance, and reconnaissance (ISR) payload 212, which may include one or more sensors, communications packages, weapons systems, instruments, antennas, cameras, radars, or other cargo. The aircraft processor 202 may be communicatively coupled with one or more feedback sensors 224, including, for example, strain gauges, differential pressure sensors, etc.

For example, a system of strain gauges and/or pressure sensors may be provided to collect a plurality of strain and/or differential pressure measurements along the span of the flexible wing 102. For example, the flexible wing 102 may utilize a continuous set of sensors (e.g., strain/torque measurement sensors) along the wing to provide feedback to the aircraft processor 202, which may then be used to manipulate the control surfaces of the tail section 108, thereby adjusting the twist of the flexible wing 102. The sensors (e.g., fiber optic strain gauges) may be embedded within micro-grooves or notches (e.g., defined through a 3D printing process). Further, the sensors may be embedded in the top and/or bottom of the wing to obtain numerous torque measurements for use in stabilization. The placement of the grooves may be determined to ensure that the fiber optic sensor yields evenly distributed, span-wise measurements, in addition to measurements for precise locations. The placement of the grooves may be determined by so as to facilitate even distribution of sensor measurements. In addition, an example distributed pressure sensor system is described in greater detail by commonly owned U.S. Patent Application No. 62/454,188 to Riley Griffin et al., which was filed on Feb. 3, 2017 and is titled "System and Method for Distributed Airflow Sensing."

The aircraft processor 202 may be operatively coupled to the flight controller 206 to control operation of the various actuators 226 (e.g., those to control movement of any flight surfaces, such as the rudders 114 and elevators 116) and/or motor 104a (e.g., via ESC 228) in response to commands from an operator, autopilot, a navigation system 210, or other high-level system via the wireless transceiver 208. In certain aspects, the aircraft processor 202 and the flight controller 206 may be integrated into a single component or circuit. In operation, the flight controller 206 may dynamically (i.e., in real-time or near real-time) and independently adjust each motor 104a and/or the various actuators 226 to control roll, pitch, or yaw of the aircraft 100 (via the tail sections 108). In other words, the flight controller 206 can independently control each of the control surfaces (e.g., the rudders 114 and/or the elevators 116) on a given tail section 108 to generate a predetermined wing-twist in the flexible wing 102; thereby generating a lateral roll moment and effectively allowing the aircraft 100 to roll and/or perform a banking turn.

The aircraft processor 202 may be operatively coupled to the navigation system 210, which may comprise a global positioning system (GPS) 210a that is communicatively coupled with an Inertial Navigation System (INS) 210b and/or an inertial measurement unit (IMU) 210c, which can include one or more gyros and accelerometers. The GPS 210a gives an absolute drift-free position value that can be used to reset the INS solution or can be blended with it by use of a mathematical algorithm, such as a Kalman Filter. The navigation system 210 may communicate, inter alia, inertial stabilization data to the aircraft processor 202.

To collect data and/or monitor an area, the aircraft 100 may further be equipped with an ISR payload 212 comprising, for example, one or more cameras 212a (e.g., an optical instrument for recording or capturing images and/or video, including light detection and ranging (LIDAR) devices), audio devices 212b (e.g., microphones, echolocation sensors, etc.), and other sensors 212c to facilitated ISR functionality and provide ISR data (e.g. photographs, video, audio, sensor measurements, etc.). The ISR payload 212 is operatively coupled to the aircraft processor 202 to facilitate communication of the ISR data between the ISR payload 212 and the aircraft processor 202. The ISR data may be used to navigate the aircraft 100. The ISR payload 212 may be rotatably and pivotally coupled to, for example, the underside surface of the flexible wing 102 (or another structural component, such as the tail booms 106) via a gimbal system to enable the ISR payload 212 to be more easily oriented downward to monitor objects below and/or on the ground. The data may be dynamically or periodically communicated from the aircraft 100 to the remote device 216 over the network 214 via the wireless transceiver 208, or stored to the memory device 204 for later access or processing.

The aircraft processor 202 may be operatively coupled to an energy storage device 220, which may be a rechargeable battery, a regenerative fuel cell, or combinations thereof. For example, the rechargeable battery may be a lithium ion battery. The energy storage device 220 may be configured to power the entire aircraft 100 by delivering the stored electrical energy to the aircraft processor for further conditioning, conversion, or control. A power management device 228 may be may be provided to convert and/or condition the electrical power received from the power supply (e.g., solar panels 218, AC charge port 230, or DC charge port 232) and to send the conditioned power to charge the energy storage device 220.

The power management device 228 may employ, depending on the type of power supply one or more AC-to-DC converters and/or one or more DC-to-DC converters (e.g., buck, boost, buck-boost, and flyback converters). To that end, the energy storage devices 220 may be used to store collected solar-energy for later use by the aircraft 100. Furthermore, the aircraft processor 202 may be configured to determine the solar panel efficiency and/or health, as well as, dynamically determine the most effective flight path and/or flight orientation in order to maximize solar energy capture. An example power distribution system for use in a solar vehicle is described in greater detail by commonly owned U.S. patent application Ser. No. 15/593,617 to Adam Scott Ehrmantraut et al., which was filed on May 12, 2017 and is titled "Solar Power System And Method Thereof."

Figure 3A:
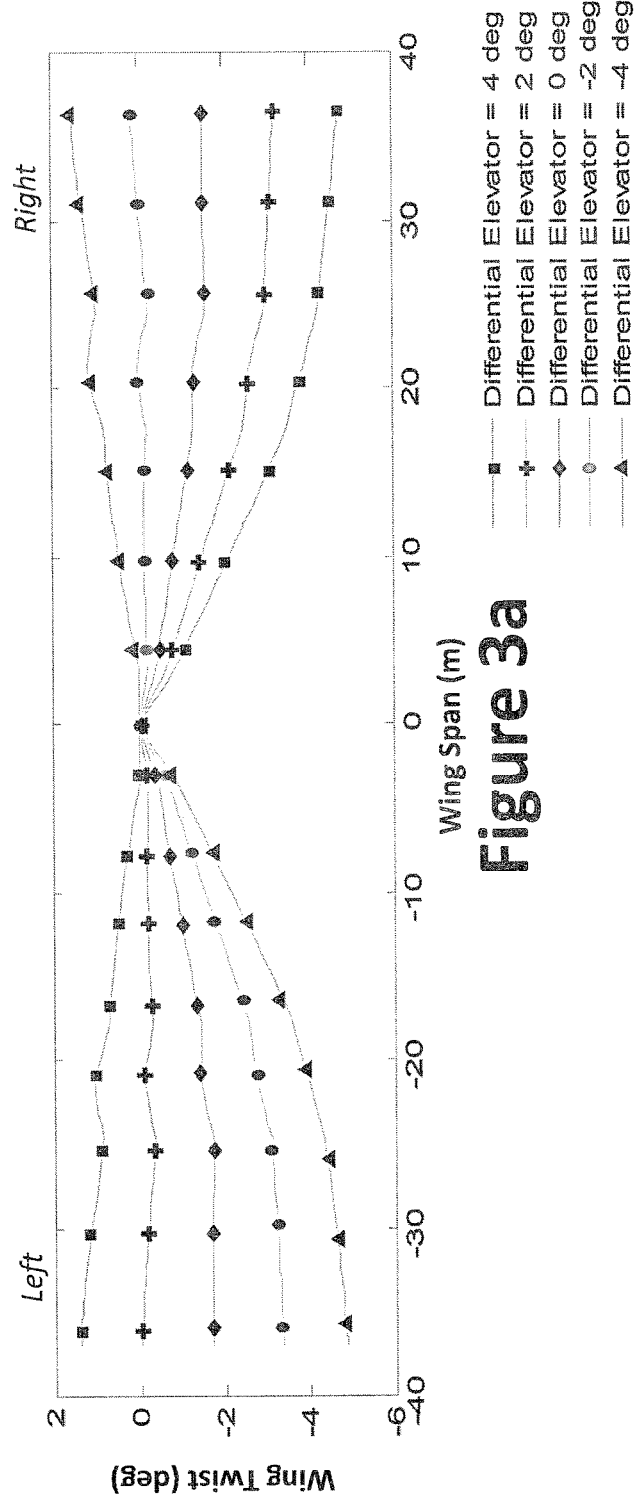
FIGS. 3a and 3b illustrate an example correlation between the amount of wing-twist experienced and the change in the local lift coefficient.
Figure 3B:
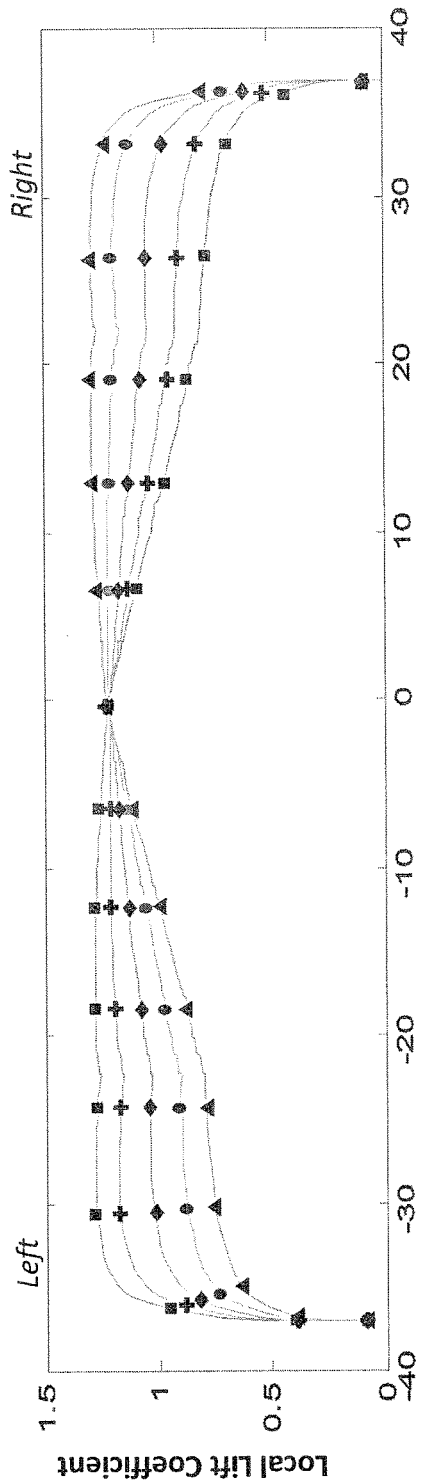

FIGS. 3a and 3b illustrate, respectively, the relationship between the amount of wing-twist experienced by the flexible wing 102 and the change in the local lift coefficient. These results demonstrate the amount the elevator deflects on the left (port) and right (starboard) side changing and how that change impacts the wing-twist resulting in a gradual variation between the two wing tips (i.e., the first wing tip 102a and the second wing tip 102b). As can be appreciated from the data, the larger twist values result in a higher local lift coefficient, while the negative twist values result in a lower local lift coefficient. For example, when the elevator differential is 4 degrees—the dataset represented by a square (■)—the left wing tip experiences a wing-twist of approximately positive 1.6 degrees at 30 meters, while the right wing tip experiences a wing-twist of approximately negative 4.25 degrees at 30 meters. This correlates to a positive change in the lift coefficient on the left wing tip to approximately 1.25, while the right wing tip changed to approximately 0.75. In this example, the left wing tip would rise, while the right wing tip would rise, thus resulting is a lateral roll in the clock-wise direction from left to right.

Figure 4:
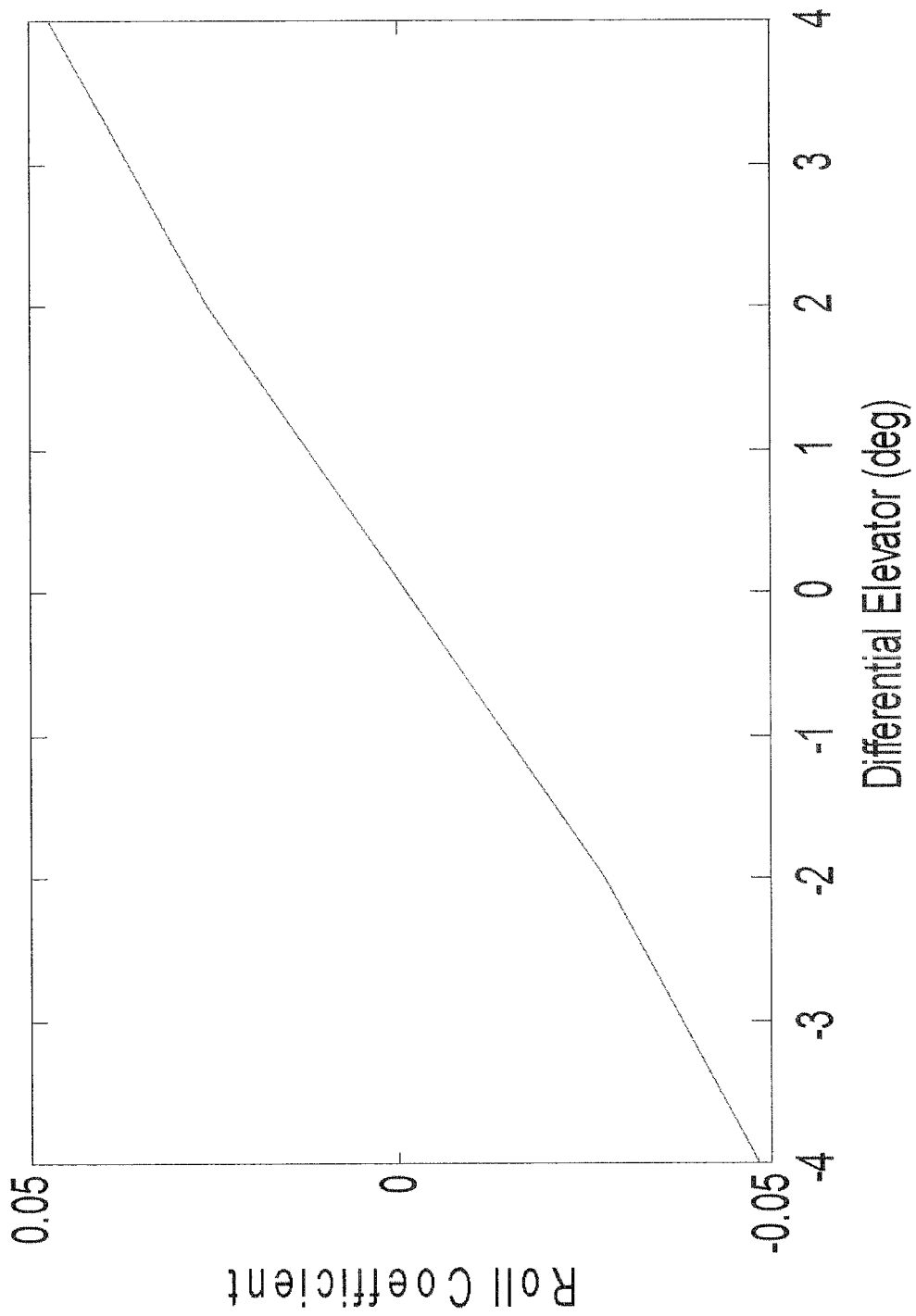

From the imbalance in force, the aircraft experiences a rolling moment with the deflections which is depicted in FIG. 4. Specifically, FIG. 4 illustrates the change in roll coefficient experienced achieved when using wing-twist as a means of flight control. As can be appreciated from FIGS. 3a and 3b, the tail sections 108 can be selectively controlled to create an imbalance in force upon the flexible wing 102. When the left wing tip experiences a higher lift coefficient, the left wing tip will rise; conversely, the right wing tip experiences a lower lift coefficient and will fall. This combination causes the aircraft 100 to create a lateral roll moment, which tilts the wings in a similar manner to an aileron would.

Figure 5:
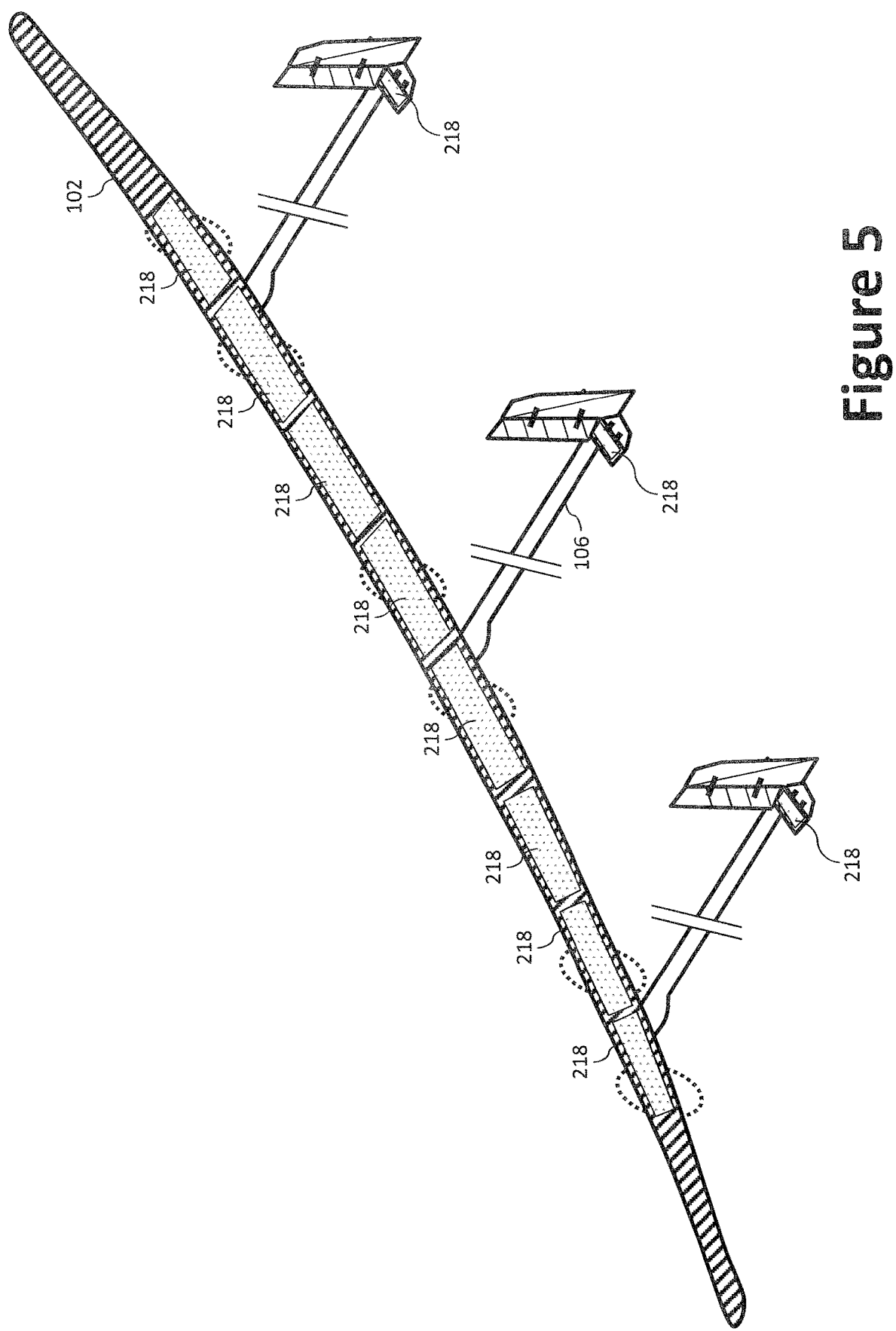
FIG. 5 illustrates an example aircraft with a flexible wing and a solar panel array.

As noted above, the aircraft 100 may be configured as a solar powered aircraft via one or more solar panels 218. To that end, the flexible wing 102 may further comprise an array of solar panels on a surface of the flexible wing. The solar panels may employ one or more of the following solar cell types: monocrystalline silicon solar cells, polycrystalline silicon solar cells, string ribbon solar cells, thin-film solar cells (TFSC), cadmium telluride (CdTe) solar cells, copper indium gallium selenide (CIS/CIGS) solar cells, and the like. To reduce overall weight and to improve reliability and durability, it is advantageous to employ light weight and/or flexible solar panels (e.g., thin-film solar panels). FIG. 5 illustrates the aircraft 100 of FIG. 1 configured for solar operation. As illustrated, a plurality of solar panels 218 may be distributed on the upper, external, surface of the horizontal stabilizer 110 and/or the vertical stabilizer 112. While not illustrated, solar panels 218 may also be positioned on the tail boom 106 (e.g., the top surface). As can be appreciated, however, positioning solar panels 218 on the tail booms 106 may not be feasible where the surface area does not justify the weight and cost of solar panels 218 (i.e., where narrow booms are used). Accordingly, the flexible wing 102, tail booms 106, and tail section 108 may be configured with solar panels 218 to capture and convert solar energy into usable electrical power.

Figure 6:
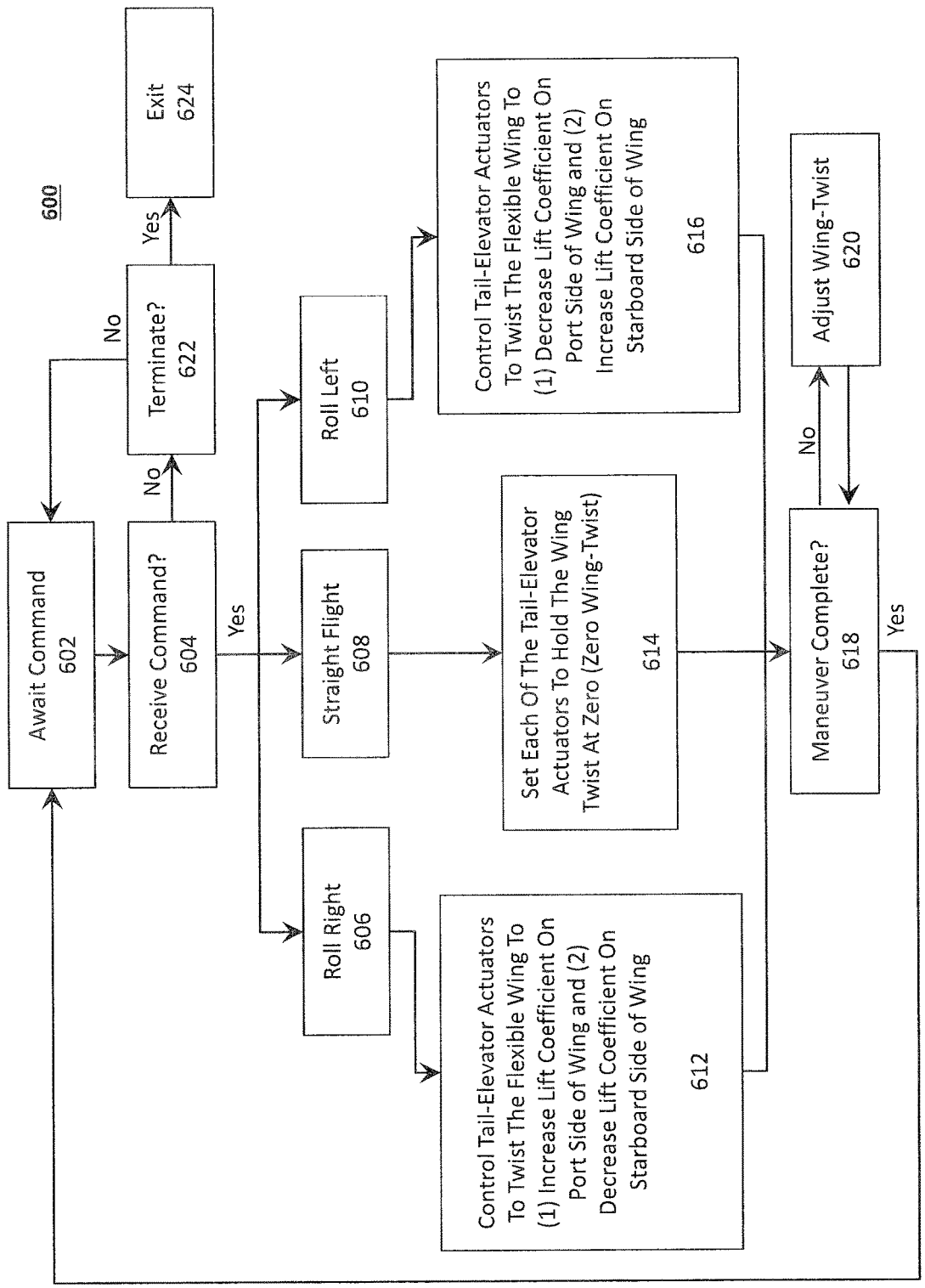
FIG. 6 illustrates a flow chart of an example wing-twist method for operating a wing-twist controlled aircraft.

FIG. 6 illustrates an example wing-twist method 600 for operating a wing-twist controlled aircraft. The wing-twist method starts at step 602 whereby the aircraft 100 (e.g., the processor 202 and/or flight controller 206 awaits a flight command). If a flight command is not received at step 604, the process enters a loop between steps 602, 604, and 622 until a flight command is received at step 604 or the process is terminated at step 622, in which case the process ends at step 624.

If a flight command is received by the processor 202 at step 604, the processor 202 may instruct the flight controller 204 at step 608 to selectively control the actuators 226 associated with elevators 116 on the tail section 108 of one or more tail booms 106 until the flexible wing 102 achieves a predetermined wing-twist on the flexible wing 102 and a predetermined difference in lift coefficient.

Where the flight command is to instruct the flight controller 204 to roll right at step 606, the processor 202 may, at step 612, instruct the actuators 226 associated with tail elevators 116 on the port side of the flexible wing 102 (i.e., those between the midpoint 102c and the first wing tip 102a) to tilt theirs elevator(s) 116 upward (i.e., the upward position), thereby causing the port side of the flexible wing 102 to twist (via the associated tail boom 106) such that the leading edge of the flexible wing 102 travels upward and the trailing edge travels downward, thereby increasing the lift coefficient on the port side of wing. The processor 202 may simultaneously instruct the actuators 226 associated with elevators 116 on the starboard side (i.e., those between the midpoint 102c and the second wing tip 102b) to tilt theirs elevator(s) 116 downward (i.e., the downward position), thereby causing the starboard side of the flexible wing 102 to twist (via the associated tail boom 106) such that the leading edge of the flexible wing 102 travels downward and the trailing edge travels upward, thereby decreasing the lift coefficient on the starboard side of wing. This action results in a positive differential elevator angle (refer to FIGS. 3a and 3b). To avoid introducing wing-twist at the midpoint, the processor 202 may instruct the actuators 226 associated with elevators 116 at the midpoint 102c to hold theirs elevator(s) 116 in a level position (i.e., where the elevators 116 is aligned with the horizontal stabilizer 110).

Where the flight command is to instruct the flight controller 204 to roll left at step 610, the processor 202 may, at step 616, instruct the actuators 226 associated with tail elevators 116 on the starboard side of the flexible wing 102 to tilt theirs elevator(s) 116 upward, thereby causing the starboard side of the flexible wing 102 to twist such that the leading edge of the flexible wing 102 travels upward and the trailing edge travels downward, thereby increasing the lift coefficient on the starboard side of wing. The processor 202 may simultaneously instruct the actuators 226 associated with elevators 116 on the port side to tilt theirs elevator(s) 116 downward, thereby causing the port side of the flexible wing 102 to twist such that the leading edge of the flexible wing 102 travels downward and the trailing edge travels upward, thereby decreasing the lift coefficient on the port side of wing. This action results in a negative differential elevator angle (refer to FIGS. 3a and 3b). To avoid introducing wing-twist at the midpoint, the processor 202 may again instruct the actuators 226 associated with elevators 116 at the midpoint 102c to hold theirs elevator(s) 116 in a level position.

Where the flight command is to instruct the flight controller 204 to flight straight (without adjusting pitch) at step 608, the processor 202 may, at step 614, maintain a symmetric wing twist configuration and/or simply hold the wing-twist at zero). For example, the tail elevators 116 may be held in a level position. This action results in a zero differential elevator angle (refer to FIGS. 3a and 3b). Other instructions may include, inter alia, pitch up or down without rolling/turning left or right, in which case, the processor 202 may set the each of the tail-elevator actuators 226 to the same tilt angle.

The processor 202 may determine at step 618 whether the maneuver is complete. If the maneuver is not complete, adjustments to the wing-twist of the flexible wing 102 based on, for example, feedback form the feedback sensors 224 may be implemented. That is, the control surfaces of the tail sections 108 may be further adjusted until a desired position is achieved. On the maneuver is completed at step 618, the process returns to step 602 to await another command.

Any patents, patent publications, or articles cited herein are hereby incorporated by reference in their entirety. It will be appreciated that the methods and systems described above are set forth by way of example and not of limitation. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context. Thus, while particular embodiments have been shown and described, it will be apparent to those skilled in the art that various changes and modifications in form and details may be made therein without departing from the spirit and scope of this disclosure and are intended to form a part of the invention as defined by the following claims, which are to be interpreted in the broadest sense allowable by law.

What is claimed is:

1. A wing-twist aircraft comprising:
   a propulsion device;
   a flexible wing having a first wing tip, a second wing tip, and a midpoint along its wingspan that is located substantially at the center between the first wing tip and the second wing tip;
   tail booms consisting of first, second, and third tail booms, each of the first tail boom, the second tail boom, and the third tail boom having a proximal end and a distal end, the proximal ends of the first tail boom, the second tail boom, and the third tail boom being connected to the flexible wing at evenly spaced locations along the wingspan of the flexible wing such that the first tail boom is evenly spaced between the first wing tip and the midpoint, the second tail boom is evenly spaced between the second wing tip and the midpoint, and the third tail boom is positioned at the midpoint; and
   first, second, and third tail sections, each of the first tail section, the second tail section, and the third tail section having at least one elevator, wherein the first tail section is coupled to the distal end of the first tail boom, the second tail section is coupled to the distal end of the second tail boom, and the third tail section is coupled to the distal end of the third tail boom.

2. The wing-twist aircraft of claim 1, wherein each of the first tail boom, the second tail boom, and the third tail boom comprise a vertical stabilizer.

3. The wing-twist aircraft of claim 1, wherein the propulsion device includes a propeller and an electric motor configured to rotate the propeller.

4. The wing-twist aircraft of claim 3, wherein the propeller is mounted to the flexible wing in a tractor configuration.

5. The wing-twist aircraft of claim 1, wherein the at least one elevator for each of the first tail section, the second tail section, and the third tail section impart a distributed twist profile throughout the flexible wing via the proximal ends of the first tail boom, the second tail booms, and the third tail boom connected to the flexible wing at the evenly spaced locations along the wingspan of the flexible wing.

6. The wing-twist aircraft of claim 1, wherein each of the first tail section, the second tail section, and the third tail section comprises a rudder.

7. The wing-twist aircraft of claim 1, wherein the first tail section, the second tail sections, and the third tail section are configured to adjust a lift distribution of the wing-twist aircraft by twisting the flexible wing to create a lateral roll moment.

8. The wing-twist aircraft of claim 1, wherein the flexible wing is devoid of movable control surfaces.

9. The wing-twist aircraft of claim 1, wherein the flexible wing does not include any movable control surfaces between the first wing tip and the second wing tip.

10. The wing-twist aircraft of claim 1, wherein the first tail boom, the second tail boom, and the third tail boom include landing gear.

11. The wing-twist aircraft of claim 1, wherein the first tail boom, the second tail boom, or the third tail boom is configured to carry an intelligence, surveillance, or reconnaissance (ISR) payload.

12. The wing-twist aircraft of claim 1, wherein each of the first tail boom, the second tail boom, and the third tail boom comprise a horizontal stabilizer.

13. A method of controlling an aircraft through adjustment of lift distribution across a flexible wing, the aircraft comprising the flexible wing and tail sections consisting of a first tail section, a second tail section, and a third tail section, wherein:
the first tail section is coupled to a port side of the flexible wing via a first tail boom, the first tail boom being positioned evenly between a port side wing tip and a wingspan midpoint,
the second tail section is coupled to a starboard side of the flexible wing via a second tail boom, the second tail boom being positioned evenly between a starboard side wing tip and the wingspan midpoint, and
the third tail section is coupled to the flexible wing via a third tail boom, the third tail boom being positioned at the wingspan midpoint, the method comprising:
receiving, via a processor, a flight command to adjust a rolling moment of the aircraft;
controlling, in response to the flight command, a first elevator to assume a first position, wherein the first elevator is coupled to the first tail section; and
controlling, in response to the flight command, a second elevator to assume a second position that is different from the first position to twist the flexible wing to a predetermined wing-twist angle, wherein the second elevator is coupled to the second tail section,
wherein the predetermined wing-twist angle is selected to achieve a predetermined difference in lift coefficient between the port side and the starboard side.

14. A method of controlling an aircraft through adjustment of lift distribution on a flexible wing, the aircraft comprising the flexible wing and tail sections consisting of a first tail section, a second tail section, and a third tail section, wherein:
the first tail section is coupled to a port side of the flexible wing via a first tail boom, the first tail boom being positioned evenly between a port side wing tip and a wingspan midpoint,
the second tail section is coupled to a starboard side of the flexible wing via a second tail boom, the second tail boom being positioned evenly between a starboard side wing tip and the wingspan midpoint, and
the third tail section is coupled to the flexible wing via a third tail boom, the third tail boom being positioned at the wingspan midpoint, the method comprising:
receiving, via a processor, a flight command to adjust a rolling moment of the aircraft; and
controlling, in response to the flight command, a first elevator coupled to the first tail section and a second elevator coupled to the second tail section to achieve a predetermined elevator degree differential.

15. The method of claim 14, wherein the first elevator and the second elevator are configured to twist the flexible wing to a predetermined wing-twist angle as a function of the predetermined elevator degree differential.

16. The method of claim 15, wherein the predetermined wing-twist angle is selected to achieve a predetermined difference in lift coefficient between the port side and the starboard side.

17. The method of claim 15, wherein the predetermined elevator degree differential is negative when the flight command is a command to roll left.

18. The method of claim 15, wherein the predetermined elevator degree differential is positive when the flight command is a command to roll right.

* * * * *